June 9, 1953  C. M. RHOTEN  2,641,173
HEATING AND VIBRATING MEANS FOR PLOW MOLDBOARDS
Filed June 17, 1950
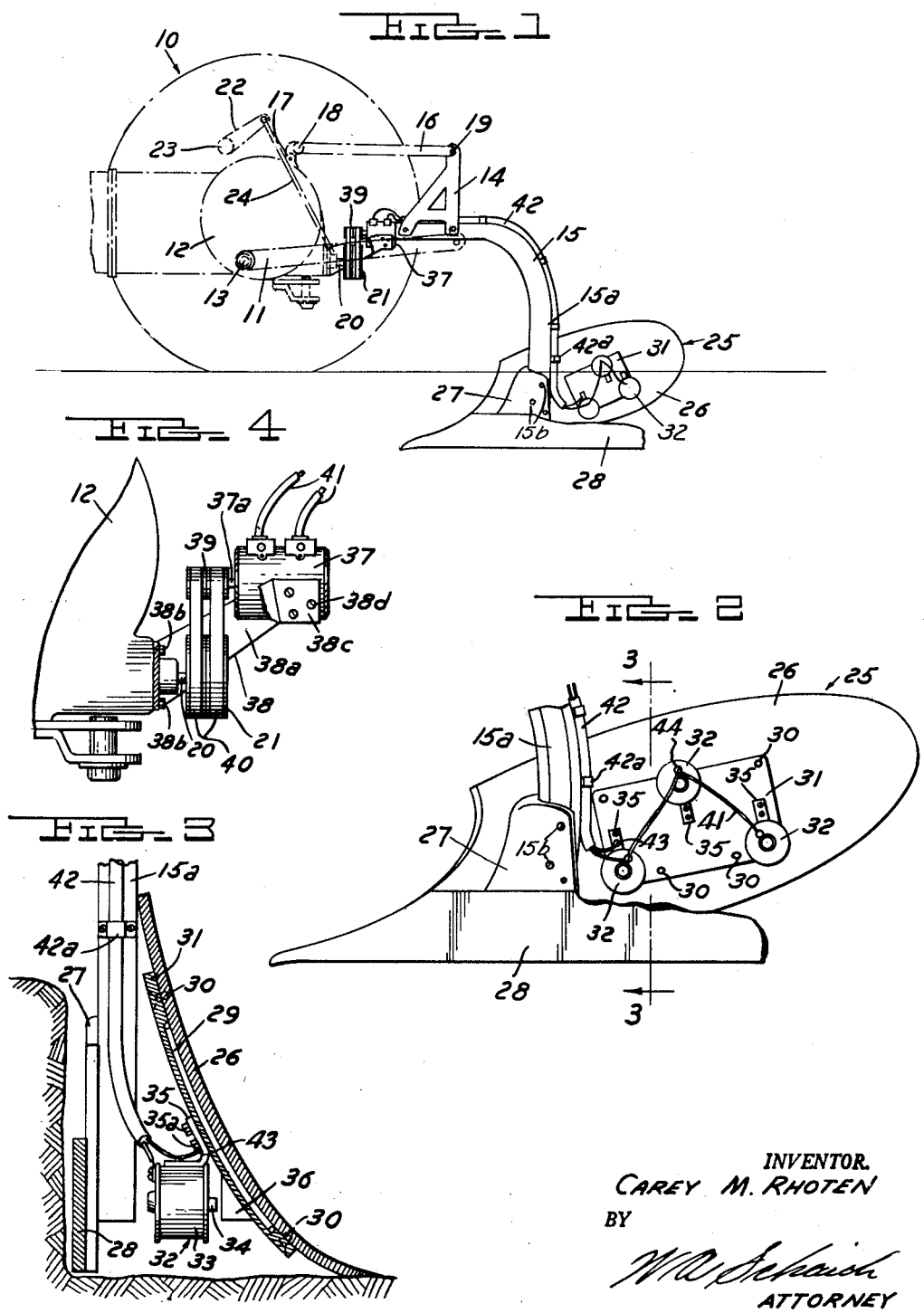
INVENTOR.
CAREY M. RHOTEN
BY
ATTORNEY Patented June 9, 1953

2,641,173

UNITED STATES PATENT OFFICE 2,641,173

HEATING AND VIBRATING MEANS FOR PLOW MOLDBOARDS

Carey M. Rhoten, Huntington Woods, Mich., assignor to Dearborn Motors Corporation, Highland Park, Mich., a corporation of Delaware Application June 17, 1950, Serial No. 168,749

1 Claim. (Cl. 97—116)

This invention relates to a method and apparatus for improving the scouring of earth working implements and particularly, moldboard plows.

Keeping the scouring surface of the moldboard of a plow free from adhering soil has long been a problem difficult of solution. In certain soils, particularly sandy and light soils, scouring of the moldboard is no problem, while in the heavier soils, especially clay, the adherence of such soils to the moldboard becomes a serious factor in proper operation of the plow. Obviously the draft requirements of the tractor are greatly multiplied when the moldboard cannot be pulled through the soil without adherence of soil thereto. Even though the scouring surface of the moldboard of a plow is highly polished or coated with a material which retains a high finish and is normally highly resistant to the adherence of various substances, the scouring properties of such surfaces have proven to be inadequate in certain types of soils.

Accordingly, it is an object of this invention to provide an improved apparatus for substantially eliminating the adherence of soil to the earth working element of an implement, and particularly the moldboards of plows.

Another object of this invention is to provide a readily mounted attachment for a moldboard plow for preventing the adherence of soil to the moldboard.

The specific nature of this invention, as well as other objects and advantages thereof, will become apparent to those skilled in the art from the following detailed description, taken in conjunction with the attached sheet of drawings on which, by way of preferred example only, is illustrated one embodiment of this invention.

On the drawings:

Fig. 1 is a reduced scale side view showing a moldboard plow mounted on a tractor and incorporating the apparatus of this invention.

Fig. 2 is an enlarged scale, elevational view of a moldboard plow having the apparatus of this invention mounted on the landside face of the moldboard.

Fig. 3 is an enlarged sectional view taken along the plane 3—3 of Fig. 2.

Fig. 4 is an enlarged fragmentary detail view showing the manner in which the power-take-off of a tractor may be utilized for driving a generator.

As shown on the drawings:

In Fig. 1 there is shown the rear end of a tractor 10 of a well known type having a pair of laterally spaced, trailing draft links 11 trailingly pivoted to the rear axle housing 12 as at 13. Hitch links 11 are respectively power lifted by a pair of rockable lift arms 22 secured to the ends of a shaft 23. Rods 24 connect arms 22 to hitch links 11. Shaft 23 is rotated by a built-in hydraulic mechanism (not shown). A so-called A-frame 14 is mounted on the trailing ends of draft links 11 and such A-frame supports a plow beam 15. A top link 16 is respectively pivotally connected to a lug 17 provided on top of axle housing 12 as at 18, and to the top of A-frame 14 by a pin 19. A power-take-off shaft 20 projects rearwardly from the axle housing 12 and a pulley 21 is secured to the end of power-take-off shaft 20 for a purpose to be later explained.

Plow beam 15 has a depending portion 15a on which there is mounted a plow bottom 25. Plow bottom 25 is of conventional construction and comprises the usual moldboard 26 secured to one side of a frog 27 while a landside 28 is secured to the other side of frog 27. Mounting bolts 15b secure frog 27 and hence plow bottom 25 to the lower end of beam 15. The above described arrangement is found on tractors and plows of well known make and hence further description thereof is not believed necessary.

On the landside surface of moldboard 26 there is secured by screws 30 a rectangular plate 31. Such plate contains an embedded electrical heating element 29 whereby the moldboard of the plow may be heated. In addition to the heating plate 31, there are provided a plurality of vibrating devices 32 which are preferably mounted on the rear surface of heating plate 31 as best shown in Fig. 2. Each vibrating device 32 comprises a solenoid 33 having a vibratory armature or plunger 34 which reciprocates within the solenoid 34 in a well known manner. Each vibrating device 32 is secured to the heating plate 31 by a welded bracket 35, in turn fastened to plate 31 by a pair of screws 35a. An anvil 36 of substantially triangular shape is welded or otherwise rigidly secured to plate 31 opposite each vibrating plunger 34 and is so disposed as to provide a perpendicular surface which may be squarely struck by the vibrating plunger 34 to impart a plurality of impact blows to moldboard 26 as will be presently described.

To provide electrical energy for heating plate 31 and for operation of solenoids 33, a generator 37 is mounted adjacent the power-take-off shaft 20 in the manner as best shown in Fig. 4. A bracket 38 having upwardly sloping arms 38a is secured to the rear of axle housing 12 by a pair of bolts 38b. The upper end of arms 38a terminate in a cradle portion 38c which horizontally supports generator 37 and such generator is secured to the cradle portion 38c by a plurality of screws 38d. Generator 37 has a forwardly projecting armature shaft 37a to which there is fixed a pulley 39. Pulley 39 is aligned with pulley 21 provided on power-take-off shaft 20 so that a pair of driving belts 40 may surround such pulleys in cooperating grooves whereby the shaft 37a of generator 37 may be driven by the power-take-off of the tractor. Electrical connection from generator 37 to vibrating members 32 and heater 29 is made by a pair of lead wires 41. Lead wires 41 are contained within a cable 42 which is secured to plow beam 15 as by clips 42a. Solenoids 33 are connected together in series, one side of the solenoid coils being connected to the ground and one of the lead wires 41 is grounded as shown at 43. The other lead wire 41 is connected as at 44 to the other side of solenoid coils 33. Heating element 29 is suitably connected to lead wires 41 in a manner not shown.

Prior to plowing in soils which normally adhere to the moldboard of the plow, the power-take-off shaft is engaged with the power drive from the tractor whereupon generator 37 is driven by belts 40. Electrical energy produced by generator 37 is then conducted to heating plate 31 and to vibrating devices 32 through the lead wires 41. A switch (not shown) may be provided for conveniently shutting off the electric power as may be desired. When plate 31 has been heated sufficiently to warm the scouring face of the moldboard, the plowing operation may be started. The vibrating plungers 34 strike anvils 36 to continuously vibrate moldboard 26, then as the moldboard passes through the earth, the vibrations imparted to the moldboard 26 will then substantially prevent any soil particles from adhering to the scouring surface of moldboard 26. Heating of the moldboard also substantially reduces the tendency of soil to adhere to the scouring surface of the moldboard by reducing the surface tension adhesion effects of the moisture film that normally forms on the scouring surface.

It will thus appear from the foregoing description that there is here provided a method and apparatus which is relatively simple and inexpensive and yet which will substantially eliminate adherence of soil particles to the scouring surface of a moldboard plow. It will be appreciated that the apparatus of this invention is not limited solely for use with moldboard plows but may be utilized with other forms of plowing or cultivating implements wherein improved soil scouring is necessary for proper operation of such implements. Furthermore, the vibratory action may be effectively employed without the heating effects.

It will, of course, be understood that various details of construction may be varied through a wide range without departing from the principles of this invention and it is therefore, not the purpose to limit the patent granted hereon otherwise than necessitated by the scope of the appended claim.

I claim:

An attachment for an implement having an earth-working element provided with a scouring surface, comprising a plate-like element shaped to conform to the contour of the rear face of said earth-working element, an electrically energizable resistance heating coil embedded in said plate-like element, an anvil rigidly secured to said plate-like element, and an electrically energizable solenoid mounted on said plate-like element adjacent said anvil, said solenoid having a reciprocable armature constructed and arranged to impart impact blows to said anvil and thereby to said plate-like element and said scouring surface upon energization of said solenoid, means for electrically energizing said heating element and said solenoid, means for rigidly mounting said plate-like element in intimate contact with the rear face of said earth-working element, said heating coil being in intimate heat exchange relation with the scouring surface of said earth-working element and said anvil being in vibration-transmitting contact with said earth-working element, whereby said earth-working element is vibrated and heated to improve the scouring properties of the scouring surface thereof.

CAREY M. RHOTEN.

References Cited in the file of this patent

UNITED STATES PATENTS

| Number | Name | Date |
|---|---|---|
| 1,122,584 | Garst | Dec. 29, 1914 |
| 1,927,177 | Ledbetter | Sept. 19, 1933 |
| 2,010,460 | McKinley | Aug. 6, 1935 |
| 2,032,688 | Dart | Mar. 3, 1936 |
| 2,332,149 | Horton | Oct. 19, 1943 |
| 2,412,240 | Williams et al. | Dec. 10, 1946 |

FOREIGN PATENTS

| Number | Country | Date |
|---|---|---|
| 894,485 | France | Mar. 13, 1944 |
| 25,566 | Norway | Feb. 22, 1915 |